Figure 1:
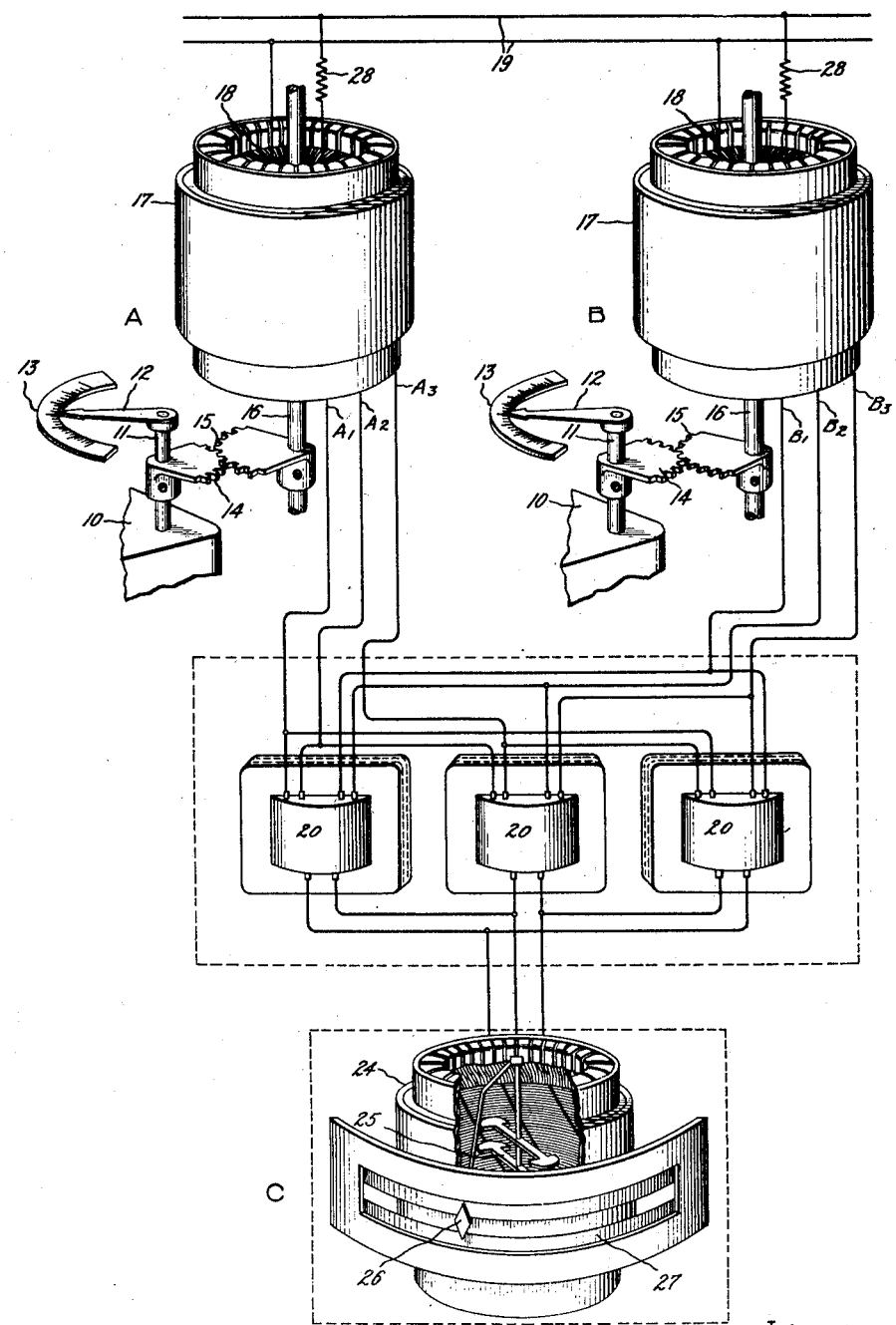

Oct. 22, 1929.       R. M. ROWELL       1,732,987
TELEMETRIC SUMMATION SYSTEM
Filed March 9, 1927      2 Sheets-Sheet 1

Inventor:
Ralph M. Rowell,
by *Alexander F. Lunt*
His Attorney.

Oct. 22, 1929. R. M. ROWELL 1,732,987
TELEMETRIC SUMMATION SYSTEM
Filed March 9, 1927 2 Sheets-Sheet 2
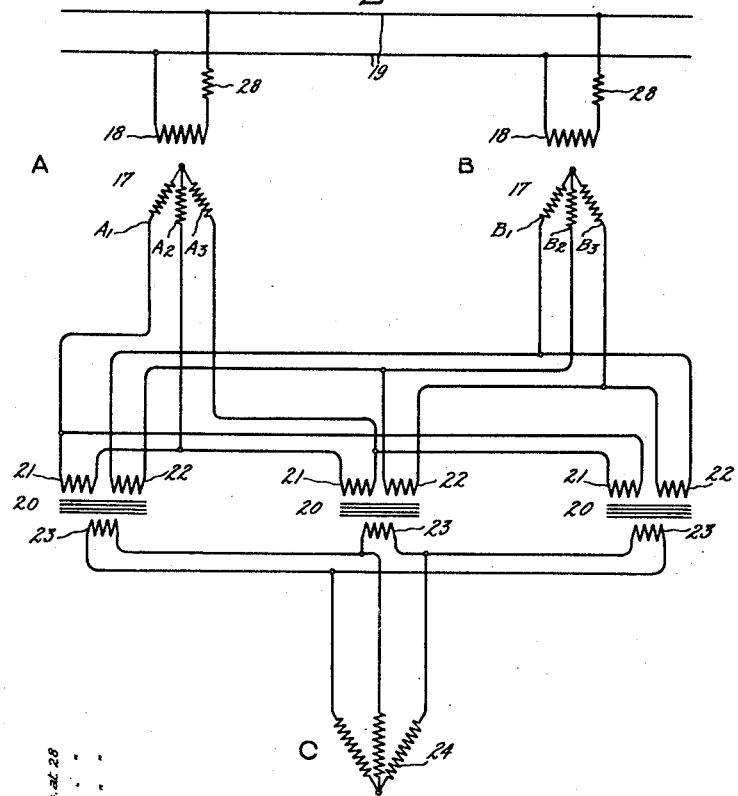
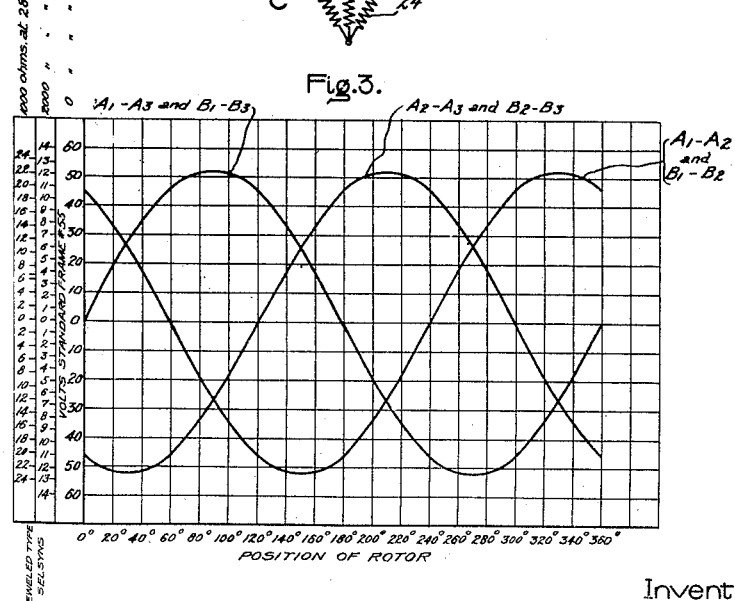
Inventor:
Ralph M. Rowell,
by
His Attorney.

Patented Oct. 22, 1929

1,732,987

UNITED STATES PATENT OFFICE

RALPH M. ROWELL, OF LYNN, MASSACHUSETTS, ASSIGNOR TO GENERAL ELECTRIC COMPANY, A CORPORATION OF NEW YORK

TELEMETRIC SUMMATION SYSTEM

Application filed March 9, 1927. Serial No. 174,083.

My invention relates to a system for summing up or averaging the readings of two or more indicating devices and giving an indication of such summation or average at any desired point.

In large electric power systems it ofttimes becomes desirable to obtain an indication of the total power delivered by two or more generator units or stations at a load control point or points which may be some distance from the point or points at which the individual loads are metered. In any such system a certain amount of flexibility is desirable to meet changing conditions such as the addition of generating units, or the change in location of the control station. My invention relates to a telemetric summation system of general application having the desirable features of simplicity, accuracy and reliability.

In carrying my invention into effect I make use of polyphase position transmitting and receiving apparatus, together with means located in the transmitting system between the transmitters and receiver for averaging the transmitted signals. The averaging means may comprise transformers having primary windings interconnected to the transmitters and secondary windings connected to the receiver. The connections are so made that this inductive coupling produces secondary voltages which are proportional to the average of the voltages coming from the transmitters. As a result the receiver always gives a position indication which is the average of the transmitter positions.

The features of my invention which are believed to be novel and patentable will be pointed out in the claim appended hereto. For a better understanding of my invention reference is made in the following description to the accompanying drawings in which Fig. 1 shows the apparatus employed for summing up the indications of two transmitters; Fig. 2 shows the electrical connections for the system of Fig. 1, and Fig. 3 shows voltage wave relations in the transformer primaries which will be referred to in explaining the invention.

Referring to Fig. 1, A and B represent transmitting stations and C a receiving station. The apparatus illustrated is to average position indications at stations A and B and transmit the result to station C and there reproduce it in the form of an average indication. At stations A and B there are provided position indicators 10 which may be wattmeters or any other indicating devices. Said devices are provided with rotatable shafts 11 carrying indicating pointers 12, which cooperate with scales 13. Shafts 11 are provided with gear sectors 14 which mesh with gear sectors 15 on the shafts 16 of electric position transmitters. As shown more clearly in Fig. 2, these transmitters are provided with polyphase stators 17 and single phase rotors 18. The rotors of all the transmitters are energized from a common single phase source of supply indicated at 19. This is the sole source of energization for the system. The stator windings are connected in star and are represented as three phase.

For this installation I provide three similar transformers 20 each having three windings 21, 22 and 23, two of which, 21 and 22, serve as primary windings, and the other, 23, as a secondary winding. The three windings on each transformer are not necessarily similar in all installations but they will be assumed to be similar here to simplify the description. The terminals of each transmitter are connected in delta to one primary winding on each of the three transformers. Thus terminals $A^1$ $A^2$ are connected in delta with primary winding 21 of the transformer on the left; terminals $A^2$ $A^3$ are connected in delta with primary winding 21 of the middle transformer, and $A^1$ and $A^3$ are connected in delta with primary winding 21 of the transformer on the right. The terminals $B^1$ $B^2$ and $B^3$ are similarly connected with the primary windings 22 of the three transformers.

At station C there is provided a receiver having a three-phase stator 24 and a rotor element comprising one or more magnetic bars 25 mounted on a shaft which carries the indicating pointer 26. The bar armature aligns itself with the field produced by the stator. The pointer 26 cooperates with the scale 27. The star-connected stator 24 of the receiver is connected in delta with the three secondary windings 23 of the three transformers 20. The three transformers 20 will preferably be so located as to reduce the length of interconnecting wire as much as possible and the impedance of the primary transformer circuits to each transmitter should be approximately the same, or if not the same, the difference should be compensated for in some way.

Fig. 3 shows the relative voltages induced across the stator terminals of the transmitters when their rotors are turned through 360 degrees. The curve resembles that of a three-phase sine wave. However, it should be borne in mind that the abscissæ of this figure represents position and not time. As represented, both transmitters are set for a zero scale indication when the voltages across their terminals 1 and 3 are zero and the range of rotation for the arrangement shown in Fig. 1 will be about 80 degrees so that here we are concerned only with the range between 0 and 80 degrees although this might be different in different installations. The voltages transmitted to the two primary windings of any one transformer will always be in phase and if both transmitters give the same indication the alternating current voltages transmitter to the two primary windings of any one transformer will be exactly the same magnitude and the secondary voltage will correspond in magnitude so that the receiver will give the same position indication as the transmitters which of course is the average of such indications. If however the position indications of the transmitters are different the voltages impressed upon the two primary windings of any transformer will no longer be equal. The voltage induced in the secondary will be proportional to the average of the two primary voltages. For example, with a 20 degree angle deflection at A and 40 degree angle deflection at B the voltage across $A_1 A_3$ is 20 and across $B_1 B_3$ is 35. Assuming the three windings of the transformers are similar the voltage induced in the secondary of the right hand transformer will be about 55 volts, which is proportional to the average voltages across the primary windings of this transformer. Similarly the transformer on the left averages the voltages of phases $A^1 A^2$ and $B^1 B^2$ and the middle transformer averages the voltages of phases $A^2 A^3$ and $B^2 B^3$. These averaged voltages are transmitted to the receiver, producing currents in the stator windings 24 and a field along an axis which lies midway between the field axis of the transmitters and produce an indication which is the average of the indications of the transmitters. Thus by using a scale 27 on the receiver of double the value of those used on the remote transmitters at A and B, the sum of the transmitted indications will be indicated at C.

Since the two applied voltages for each transformer may be different they may react back on the transmitters to a certain extent and tend to make the transmitters occupy false positions. To guard against erroneous indications I make the torques of the transmitters low with respect to the devices 10 with which they are associated, for example, by placing suitable resistances 28 in the rotor circuits of the transmitters. The effect of such resistances is shown in Fig. 3 where the three columns of ordinates represent voltages with 1000, 2000 and 0 ohms at 28 respectively. These resistances may also serve to adjust the torque relation between the two transmitters if it should happen to be improper or to compensate for differences in the impedances of the circuits connected between the transmitters and transformers. I have found that the system when properly adjusted gives accurate results.

In the foregoing it was assumed that the scales of the two transmitters were of equal length and value. Differences in these respects may be taken care of by suitably selecting the gear ratios at 14 and 15 and by using different numbers of turns in the primary windings 21 and 22 of the transformers. While the summation of only two instrument indications has been described it will be apparent that the summation of any number of instrument indications may be had by adding additional primary windings to the transformers. Thus if three indications were to be summed up I would add another primary winding to each transformer and connect said additional windings to an additional transmitter in the manner already explained. The scale of the receiver would then be replaced with one of three times the value of the transmitter scales. Other transformer connections may be employed to produce the desired result and another modification of the broad invention is described and claimed in my copending application, Serial No. 177,699, filed March 23, 1927 herewith. Indications may be substracted as well as added by this scheme and where I use the expression summation or its equivalent, I intend it in the broad sense of algebraic summation.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States is:—

A polyphase telemetric summation system comprising a plurality of polyphase transmitters and a polyphase receiver, each of which has polyphase windings, a transformer for each phase of said system having a number of separate primary windings equal to the number of transmitters and respectively energized from the corresponding phase windings of said transmitters, a single secondary winding on each transformer, said secondary winding being connected in polyphase relation to the polyphase winding of the receiver.

In witness whereof, I have hereunto set my hand this seventh day of March, 1927.

RALPH M. ROWELL.